(12) United States Patent
Knorr et al.

(10) Patent No.: US 11,016,565 B2
(45) Date of Patent: May 25, 2021

(54) POSTPONING THE STATE CHANGE OF AN INFORMATION AFFECTING THE GRAPHICAL USER INTERFACE UNTIL DURING THE CONDITION OF INATTENTIVENESS

(71) Applicant: Apple Inc., Cupertino, CA (US)

(72) Inventors: Sebastian Knorr, Mountain View, CA (US); Daniel Kurz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/888,985

(22) Filed: Jun. 1, 2020

(65) Prior Publication Data

US 2020/0293109 A1    Sep. 17, 2020

Related U.S. Application Data

(63) Continuation of application No. 15/712,649, filed on Sep. 22, 2017, now Pat. No. 10,671,159.

(60) Provisional application No. 62/398,438, filed on Sep. 22, 2016.

(51) Int. Cl.
*G06F 3/048* (2013.01)
*G06F 3/01* (2006.01)
*G02B 27/00* (2006.01)
*G06F 3/0481* (2013.01)
*G02B 27/01* (2006.01)

(52) U.S. Cl.
CPC ............. *G06F 3/013* (2013.01); *G02B 27/00* (2013.01); *G02B 27/0093* (2013.01); *G06F 3/048* (2013.01); *G06F 3/0481* (2013.01); *G02B 2027/0138* (2013.01)

(58) Field of Classification Search
CPC ........ G06F 3/013; G06F 3/048; G06F 3/0481; G02B 27/00; G02B 27/0093; G02B 27/0172; G02B 2027/0138; G02B 2027/014
See application file for complete search history.

(56) References Cited

U.S. PATENT DOCUMENTS 8,265,607 B2  9/2012  Wormald
8,493,390 B2  7/2013  Kalinli
(Continued)

FOREIGN PATENT DOCUMENTS

JP    2009294735 A    12/2009
JP    2013082445 A    5/2013
(Continued)

OTHER PUBLICATIONS

Tag, et al., "Eye Blink as an Input Modality for a Responsive Adaptable Video System," UBICOMP/ISWC '16 Adjunct, Sep. 12-16, 2016, Heidelberg, Germany.

*Primary Examiner* — Alvin H Tan
(74) *Attorney, Agent, or Firm* — Blank Rome LLP

(57) ABSTRACT

Triggering a state change includes displaying a first version of a series of frames based on a first setup configuration, obtaining a second setup configuration for the series of frames, in response to obtaining a second setup configuration, monitoring for a change in an eye status, and in response to detecting a change in the eye status, displaying a second version of the series of frames based on the second setup configuration.

20 Claims, 8 Drawing Sheets

(56) References Cited

U.S. PATENT DOCUMENTS

| | | | |
|---|---|---|---|
| 8,836,641 B1* | 9/2014 | Kim | G02B 27/0093 |
| | | | 345/156 |
| 9,423,994 B2 | 8/2016 | Suresh | |
| 9,600,306 B2 | 3/2017 | Hamilton, II | |
| 9,886,177 B2* | 2/2018 | Lee | G06F 3/0484 |
| 9,892,535 B1 | 2/2018 | Guy | |
| 9,977,909 B1 | 5/2018 | Austin | |
| 10,545,338 B2* | 1/2020 | Stafford | G02B 27/0093 |
| 2003/0201895 A1 | 10/2003 | Harter | |
| 2011/0221656 A1 | 9/2011 | Haddick | |
| 2013/0097557 A1 | 4/2013 | Madau et al. | |
| 2013/0219012 A1 | 8/2013 | Suresh | |
| 2015/0143234 A1 | 5/2015 | Norris, III | |
| 2015/0187098 A1 | 7/2015 | Ofstad | |
| 2015/0338915 A1 | 11/2015 | Publicover | |
| 2016/0180762 A1 | 6/2016 | Bathiche | |
| 2016/0259405 A1 | 9/2016 | Wilson | |
| 2017/0075419 A1 | 3/2017 | Parthasarathy | |
| 2017/0090585 A1* | 3/2017 | Bernhart | G06F 3/0304 |
| 2017/0160799 A1 | 6/2017 | Shi | |

FOREIGN PATENT DOCUMENTS

| | | | |
|---|---|---|---|
| JP | 2014038523 A | 2/2014 | |
| JP | 2014081834 A | 5/2014 | |
| JP | 2016517087 A | 6/2016 | |
| KR | 20110035585 A | 4/2011 | |

* cited by examiner

POSTPONING THE STATE CHANGE OF AN INFORMATION AFFECTING THE GRAPHICAL USER INTERFACE UNTIL DURING THE CONDITION OF INATTENTIVENESS

BACKGROUND

This disclosure relates generally to the field of digital image processing, and more particularly to the field of graphical user interface (GUI) design. Specifically, to postponing a state change of information affecting a GUI and triggering the state change during a condition of inattentiveness of a user of the GUI.

Current technology allows users to interact with their environment in a number of ways. By way of example, GPS devices to gaming software allow users to interact with a real world environment in innovative ways. One problem in blending virtual information into a real environment is that changes made to a graphical user interface can be abrupt and distracting to a user, to the detriment of the user experience.

As an example, a state change of information on the GUI may either change while a user is focusing on it, causing confusion, or may change when a user is focused on something nearby in the GUI, which might cause the user to become distracted. Words or objects in a computer game may be loaded dynamically and suddenly appear. The level of detail displayed on a screen may suddenly change, causing confusion to a user. An enhanced user experience is needed to deal with state changes of data being displayed.

SUMMARY

In one embodiment, a method for triggering a state change is described. The method may include displaying a first version of a series of frames based on a first setup configuration, obtaining a second setup configuration for the series of frames, in response to obtaining a second setup configuration, monitoring for a change in an eye status, and in response to detecting a change in the eye status, displaying a second version of the series of frames based on the second setup configuration. In another embodiment, the method may be embodied in computer executable program code and stored in a non-transitory storage device. In yet another embodiment, the method may be implemented in an electronic device having image capture capabilities.

DETAILED DESCRIPTION

Figure 1:
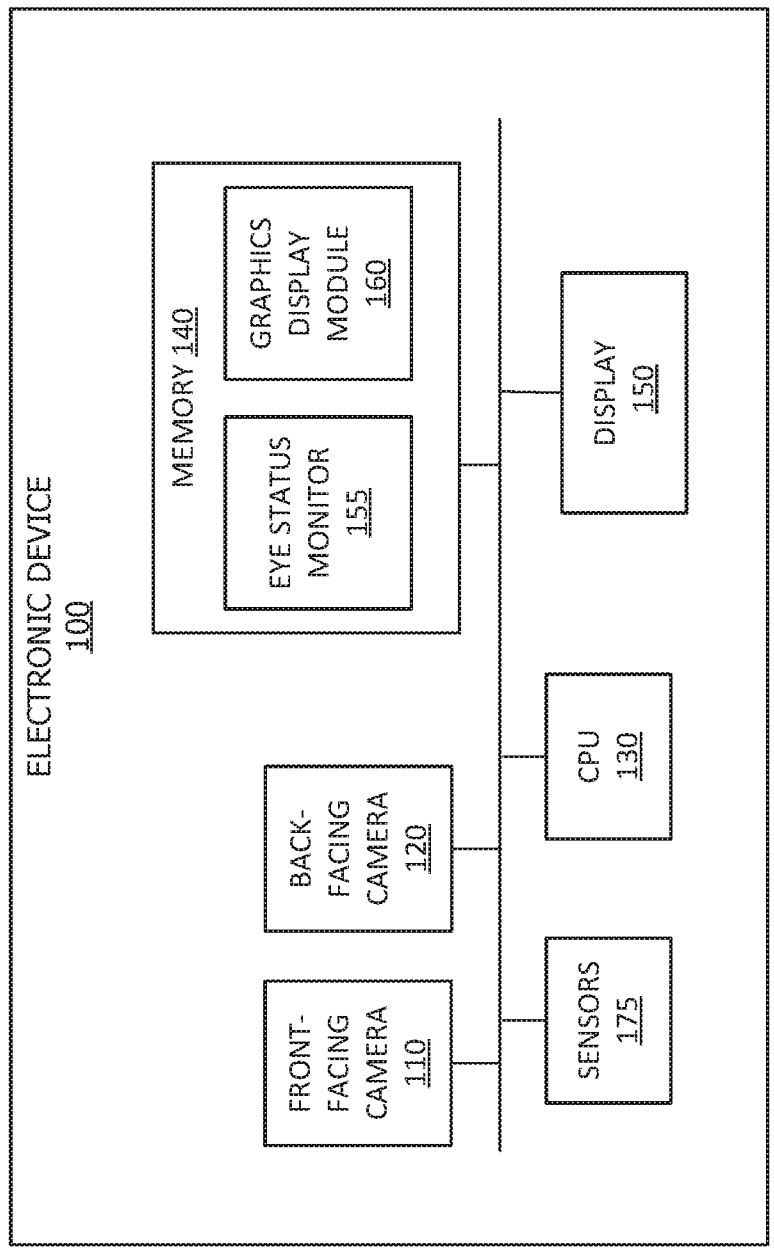
FIG. 1 shows, in block diagram form, a simplified electronic device according to one or more embodiments.

This disclosure pertains to systems, methods, and computer readable media for postponing the state change of information affecting a graphical user interface (GUI) during the condition of inattentiveness. In general, techniques are disclosed for managing a display on a GUI such that, when a setup configuration for a series of frames is detected, a new version of the series of frames may be rendered, but is not displayed until a user is determined to be inattentive. For example, according to one or more embodiments, the first version of the set of frames may be displayed until the user is determined to blink or look away. According to one or more embodiments, changing the display during a status of user inattentiveness may minimize or lessen the distraction from the change to the user.

According to one or more embodiments, upon detecting a new setup configuration, a system may render a second version of the series of frames while the first series of frames is displayed. That is, the first version of the series of frames and the second version of the series of frames may be rendered in parallel. In some embodiments, both versions of the series of frames may be rendered until the second version of frames may be displayed. The second series of frames may not be rendered until a change in eye status is detected, or when a change in the eye status is anticipated. Thus, the two versions of the series of frames may be generated in parallel for a shorter period of time.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of flow diagrams. The boxes in the flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera" refers to a single lens assembly along with the sensor element and other circuitry utilized to capture an image. For purposes of this disclosure, two or more cameras may share a single sensor element and other circuitry, but include two different lens assemblies. However, in one or more embodiments, two or more cameras may include separate sensor elements as well as separate lens assemblies and circuitry.

Referring to FIG. 1, a simplified block diagram of an electronic device 100 is depicted, in accordance with one or more embodiments of the disclosure. Electronic device 100 may be part of a multifunctional device, such as a mobile phone, tablet computer, personal digital assistant, portable music/video player, or any other electronic device that includes a camera system, a display, and other components utilized for performing the various embodiments. Electronic Device 100 may be connected to other network devices across a network, such as mobile devices, tablet devices, desktop devices, as well as network storage devices such as servers and the like.

Electronic Device 100 may include a central processing unit (CPU) 130. Processor 130 may be a system-on-chip such as those found in mobile devices and include one or more dedicated graphics processing units (GPUs). Further, processor 130 may include multiple processors of the same or different type. Electronic Device 100 may also include a memory 140. Memory 140 may include one or more different types of memory, which may be used for performing device functions in conjunction with CPU 130. For example, memory 140 may include cache, ROM, and/or RAM. Memory 140 may store various programming modules during execution, including eye status monitor 155 and graphics display module 160. According to one or more embodiments, memory 140 may include additional applications utilized for generating and managing a graphical user interface based on dynamic setup configuration data. For example, memory 140 may additionally include a rendering engine.

Electronic device 100 may also include one or more cameras, such as front-facing camera 110 and back-facing camera 120. Cameras 110 and 120 may each include an image sensor, a lens stack, and other components that may be used to capture images. In one or more embodiments, the cameras may be directed in different directions in the electronic device. For example, front-facing camera 110 may be positioned in or on a first surface of the electronic device 100, while the back-facing camera 120 may be positioned in or on a second surface of the electronic device 100. In one or more embodiments, the first and second surfaces may be opposite surfaces of electronic device 100. As another example, front-facing camera 110 may be configured to capture images of a real environment from the point of view of a user, whereas back-facing camera 120 is configured to capture images of the user. Although two cameras are depicted, as will be described in further detail below, in some embodiments, electronic device 100 may include a single camera. In still other embodiments, electronic device 100 may also include display 150. Sensors 175 may include any kind of sensor which may be used, for example, in determining a state of an eye, such as a direction of a gaze or whether the eye is open or closed. Display 150 may be any kind of display device, such as an LCD display, LED display, OLED display, or the like. In addition, display 150 could be a semi-opaque display, such as a heads up display or the like. Although electronic device 100 is depicted as comprising the numerous components described above, in one or more embodiments the various components may be distributed across multiple devices. Further, additional components may be used and some combination of the functionality of any of the components may be combined.

According to one or more embodiments, eye status monitor 155 monitors a status of an eye. In some embodiments, the eye status indicates the attentiveness or inattentiveness of a user. That is, the eye status monitor 155 may determine whether a user is attentive based on data received, for example, from front-facing camera 110 or from various sensors 175. In addition, eye status monitor 155 may anticipate a change in eye status. For example, images from front-facing camera 110 may indicate that an eye is closed or is closing, or whether the eye is looking at a direction different than the display 150. As another example, sensors that monitor muscles surrounding the eye may detect that an eye is about to blink, thus anticipating a change in the eye status. In one or more embodiments, eye status monitor 155 may continuously monitor the status of the eyes, or may monitor the status of the eyes on a periodic basis or when needed. For example, eye status monitor 155 may monitor the status of the eyes in response to determining that a new setup configuration is available.

According to one or more embodiments, graphics display module 160 may be configured to generate a series of frames based on a given setup configuration. In one or more embodiments, the setup configuration may be based on data received locally, for example, by sensors 175 or cameras 110 and 120. Additionally, or alternatively, data for the setup configuration may be received from remote sources, such as network devices or servers. As an example, if electronic device 100 is displaying directions on a map, the setup configuration may include data from a GPS unit (not shown). Graphics display module 160 may occasionally receive updated setup configuration information which changes the view of a GUI as a series of frames. As an example, if updated GPS information indicates that a user is actually on a different road or lane than an initial setup configuration data indicated, then a second version of the series of frames may be rendered. In one or more embodiments, graphics display module 160 may generate multiple series of frames simultaneously. Returning to the example, if updated GPS data is received, graphics display module 160 may begin rendering a second version of the series of frames while the first series of frames is still being rendered and displayed. Thus, graphics display module 160 may toggle from the first version of the series of frames to the second version of the series of frames on demand. According to one or more embodiments, graphics display module 160 may determine when to begin displaying the second version of the series of frames based on a change in eye status as determined by eye status monitor 155. In some embodiments, graphics display module 160 may switch the displayed version of configuration information when it is determined that the user is inattentive. Said another way, graphics display module 160 may postpone the state change of the graphical representation in the GUI until the condition of inattentiveness is met.

As an example, in computer gaming, the new setup configuration may include new objects becoming available for display in a gaming environment. Graphics display module 160 may continue to present the gaming environment without the new objects and present them while the user is blinking such that after the blink, the new objects are displayed. Similarly, graphics display module 160 may postpone changes of a rendered virtual object for display in a real environment, in an augmented reality application. As another example, a progressive JPEG may transition from coarser to finer blocks, or finer to coarser blocks. The graphics display module 160 may postpone the display of the updated level of detail until the user is inattentive. The setup configuration may apply to level of detail in other way. For example, when zooming into a map, information such as street names or neighborhoods may appear or disappear. Graphics display module 160 may postpone changing the displayed level of detail on the map until the user is inattentive.

Figure 2:
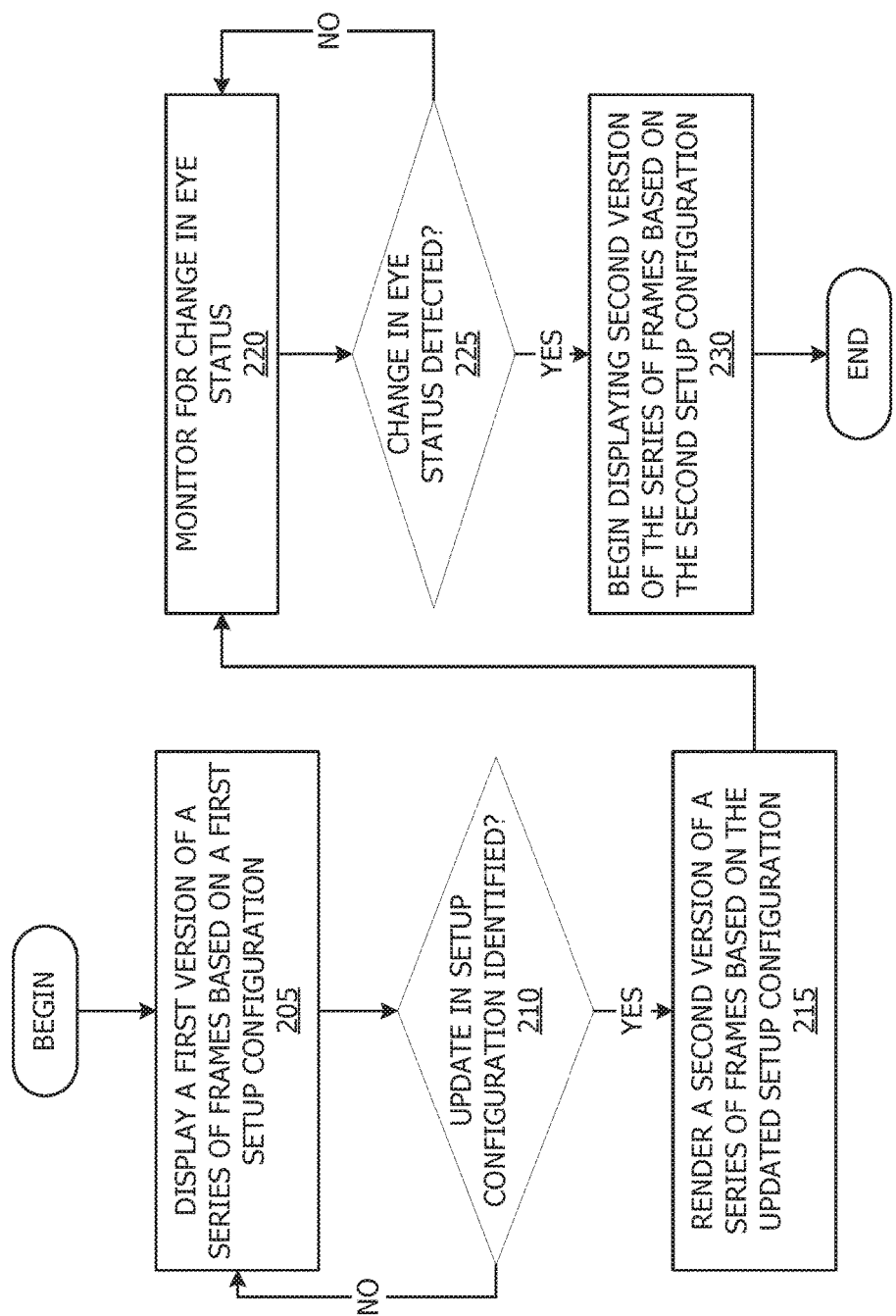
FIG. 2 shows, in flowchart form, a method for managing a state change affecting a GUI in accordance with one or more embodiments.

FIG. 2 shows, in flowchart form, a method for managing a state change affecting a GUI in accordance with one or more embodiments. Although the various actions are depicted in a particular order, in different embodiments, the various actions may be depicted in a different order. Further, in some embodiments, two or more of the actions may occur simultaneously. In other embodiments, some of the actions may not be required, or other actions may be included. For purposes of clarity, the flowchart will be described with respect to the various components of FIG. 1. However, it should be understood that the various actions may be taken by alternative components.

The flowchart begins at 205 where graphics display module 160 causes to be displayed a first version of a series of frames on display 150. In one or more embodiments, graphics display module 160 may generate the initial series of frames based on a first setup configuration. The first setup configuration may be any data that indicates how a series of frames should be rendered. In one or more other embodiments, graphics display module 160 may present a series of frames as captured by a camera, such as back-facing camera 120, or may present frames that are generated by another method. Further, the series of frames may include additional information that is rendered based on other data. For example, data gathered from a remote server, or from sensors 175. As an example, graphics display module 160 may present on display 150 a virtual object in the view of a real environment captured by back-facing camera 120.

The flowchart continues at 210, and a determination is made regarding whether an update in setup configuration is identified. As described above, the update in setup configuration may be any kind of data that determines how the series of frames is rendered. For example, more or less detail may be available, or depending on other factors, it may be preferable to include a greater or lesser level of detail. If no update is detected, then the flowchart continues at 205, and the graphics display module 160 continues to display the first version of the series of frames based on the first setup configuration. Returning to 210, if it is determine that an update in the setup configuration is identified, then the flowchart continues at 215, and the graphics display module 160 renders a second version of a series of frames based on the updated setup configuration.

The flowchart continues at 220 where eye status monitor 155 monitors for a change in the eye status. According to one or more embodiments, eye status monitor 155 may monitor for a change in gaze, or a blink, either of which may indicate an inattentive status of the user. In some embodiments, eye status monitor 155 may monitor images of the eye, for example, provided by front-facing camera 110. Further, in other embodiments, eye status monitor 155 may rely on additional sensor data from sensors 175 to determine a change in eye status. According to some embodiments, eye status monitor 155 may continuously monitor the state of the eyes of a user, or may begin monitoring the state of the eyes in response to the identification of a setup configuration update, or in response to graphics display module 160 rendering the second version of the series of frames based on the updated setup configuration.

The flowchart continues at 225 where a determination is made regarding whether the change in the eye status is detected. According to one or more embodiments, the change in eye status may indicate that the user is inattentive. For example, the user is blinking, or is looking away from the display. In other embodiments, if the eye or eyes of the user are still open, then looking away may not be sufficient to render the user inattentive. Rather, the user must be looking in such a way that the user would not be conscious of a change in the display. For example, merely looking at a different location may be insufficient if the user could still notice an abrupt change in the graphics of the GUI. For example, in a user's peripheral vision. If, at 225 a change in the eye status is not detected, the flowchart continues at 220 where eye status monitor 155 continues to monitor for a change in the eye status. Returning to 225, if it is determined that a change in the eye status is detected, the flowchart continues at 230, where graphics display module 160 begins displaying the second version of the series of frames based on the second setup configuration.

Figure 3:
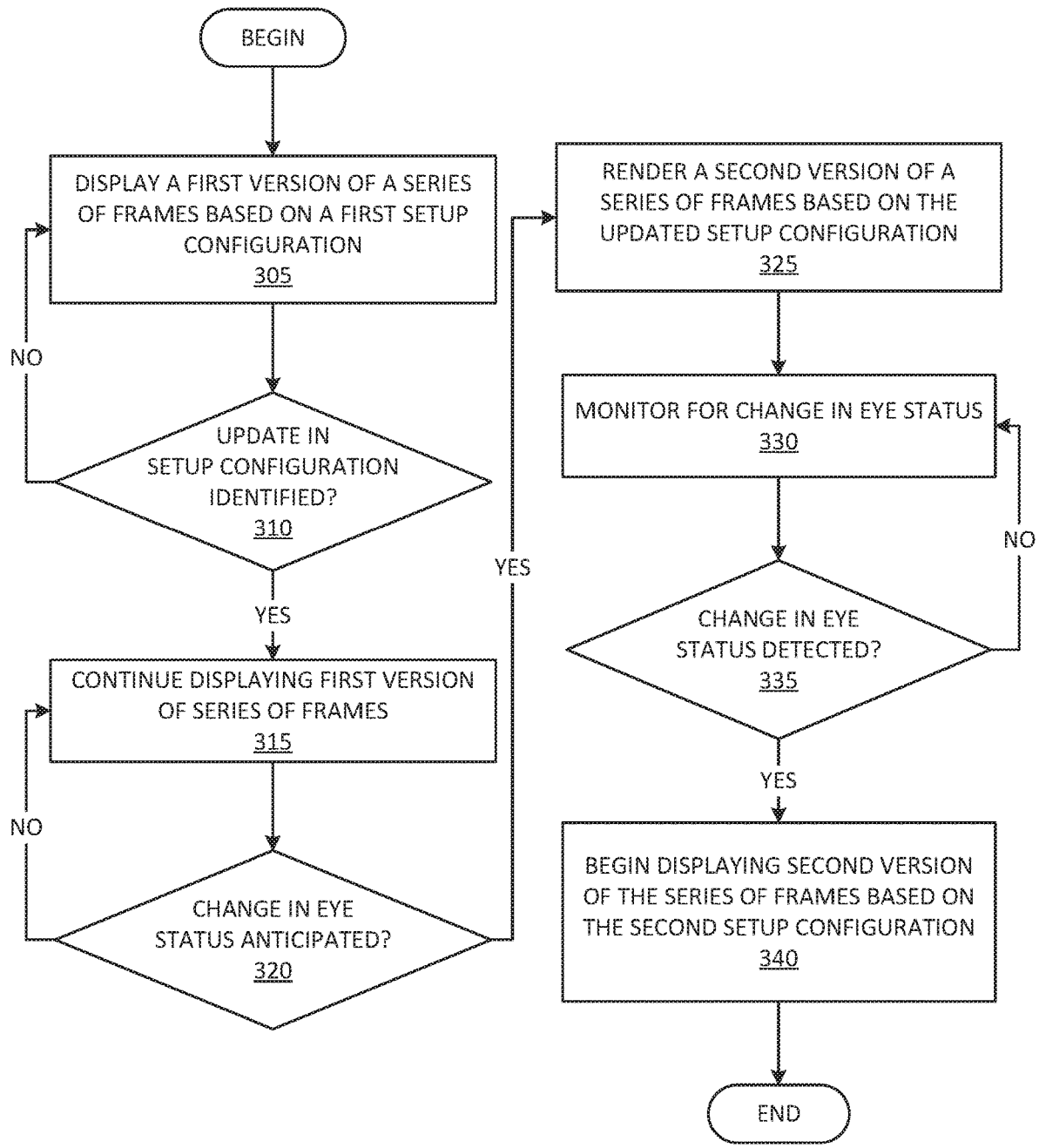
FIG. 3 shows, in flowchart form, another method for managing a state change affecting a GUI in accordance with one or more embodiments.

FIG. 3 shows, in flowchart form, another method for managing a state change affecting a GUI in accordance with one or more embodiments. The flowchart of FIG. 3 may depict an alternate embodiment to that of FIG. 2. Although the various actions are depicted in a particular order, in some embodiments the various actions may be depicted in a different order. Further, in still other embodiments, two or more of the actions may occur simultaneously. In addition, according to yet other embodiments, some of the actions may not be required, or other actions may be included. For purposes of clarity, the flowchart will be described with respect to the various components of FIG. 1. However, it should be understood that the various actions may be taken by alternative components, according to one or more embodiments.

The flowchart begins at 305 where graphics display module 160 causes to be displayed a first version of a series of frames on display 150. In one or more embodiments, graphics display module 160 may generate the initial series of frames based on a first setup configuration. The first setup configuration may be any data that indicates how a series of frames should be rendered. In other embodiments, graphics display module 160 may present a series of frames as captured by a camera, such as back-facing camera 120, or may present frames that are generated by another method. Further, the series of frames may include additional information that is rendered based on other data, for example, data gathered from a remote server, or from sensors 175. As an example, graphics display module 160 may present on display 150 a virtual object in the view of a real environment captured by back-facing camera 120.

The flowchart continues at 310 where a determination is made regarding whether an update in setup configuration is identified. As described above, the update in setup configuration may be any kind of data that determines how the series of frames should be rendered. For example, more or less detail may be available, or depending on other factors, it may be preferable to include a greater or lesser level of detail. If no update is detected, the flowchart continues at 305 where graphics display module 160 continues to display the first version of the series of frames based on the first setup configuration. However, in contrast to the steps depicted in FIG. 2, if at 310 an update in a setup configuration is identified, the flowchart continues at 315 where graphics display module 160 may continue to display the first version of the series of frames.

The flowchart continues at 320 where eye status monitor 155 monitors the eye to determine whether a change in the eye status is anticipated. According to one or more embodiments, the change in eye status may be anticipated, for example, based on images from front-facing camera 110. In other embodiments, the images may indicate, for example, that an eye is closing. As another example, other sensor data may be collected from sensors 175 to determine whether a blink or other movement is occurring that indicates that a change in eye status is anticipated. For example, sensor data may monitor muscle movement of muscles around the eye to anticipate when a blink is imminent. In response to determining that a change in eye status is anticipated, the flowchart continues at 325 where graphics display module 160 renders a second version of the series of frames based on the updated setup configuration.

The flowchart continues at 330 where eye status monitor 155 monitors for a change in the eye status. According to one or more embodiments, eye status monitor 155 may monitor the eyes to verify the change in eye status. As an example, rather than just anticipating a blink, eye status monitor 155 may monitor to verify the blink. The flowchart continues at 335 where a determination can be made regarding whether the change in the eye status is detected. According to some embodiments, the change in eye status may indicate that the user is inattentive. For example, the user is blinking, or is looking away from the display. In one or more other embodiments, if the eye or eyes of the user are still open, then looking away may not be sufficient to render the determination that the user is inattentive. Rather, the user must be looking in such a way that the user would not be conscious of a change in display 150. For example, merely looking at a different location may be insufficient if the user could still notice an abrupt change in the graphics of the GUI, for example, in a user's peripheral vision. If, at 335 a change in the eye status is not detected, then the flowchart continues at 330 where eye status monitor 155 continues to monitor for a change in the eye status. Returning to 335, if it is determined that a change in the eye status is detected, then the flowchart continues at 340 where graphics display module 160 begins displaying the second version of the series of frames based on the second setup configuration.

According to one or more embodiments, the distinction between the flowchart of FIG. 2 and the flowchart of FIG. 3 is when the second version of the frames begin to be rendered. In one or more embodiments, it may be preferable to begin rendering a second version of the frames when the updated setup configuration is available, as in FIG. 2, in order to make a rapid change between the display of the first version of the frames and the second version of the frames. Further, according to other embodiments, it may be preferable to begin to render the second version of frames in response to an anticipated change in state of the eye. For example, postponing the rendering of the second version of the frames may be preferable in order to conserve resources. According still other embodiments, the time at which graphics display module 160 begins to render the second version of the frames may be determined based on other factors, such as whether computing resources should be conserved, or a rate of change of the setup configuration.

Figure 4:
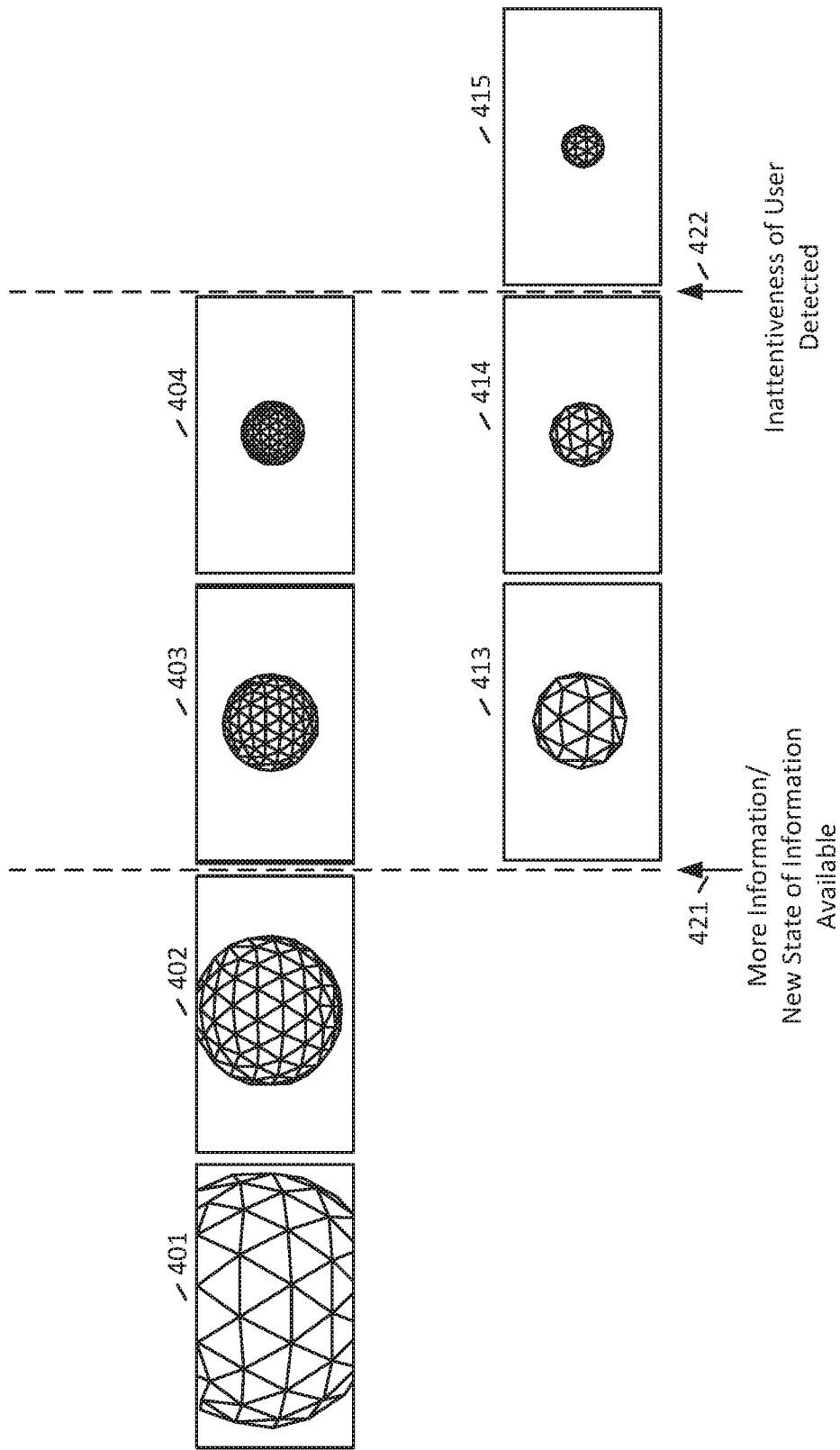
FIG. 4 shows an example flow diagram illustrating managing a state change of a level of detail according to one or more embodiments.

FIG. 4 illustrates an example use-case, where the change in level of detail is postponed until the user is inattentive. Originally the level of detail to be used for rendering a virtual object may depend on the distance of the virtual object to the camera. Each level of detail, and e.g. the associated 3D model, may be associated with a particular interval of distance. A change in the used level of detail may be triggered when the distance passes a certain threshold. As an example, the change in the level of detail may be triggered when the distance leaves one interval and enters another. In 401, the sphere object is near to the camera, so that a highly tessellated model is used for rendering. When the model moves further away (as in 402) from the camera, the same level of detail may be used. But at a certain point in time (421) the object is so far away that another level of detail would be selected. In response to passing the threshold distance at 421, the sphere object may be rendered with less detail, as shown in 413. The change from image 402 to image 413 would be noticeable by the user. However, this change in the level of detail is again postponed until the user is inattentive, at 422. Thus the user would continue to view the high tessellated model in frames 403 and 404. In one or more embodiments, only when the user was inattentive at 422, is the change to the low resolution mesh performed and displayed as frame 415.

Figure 5:
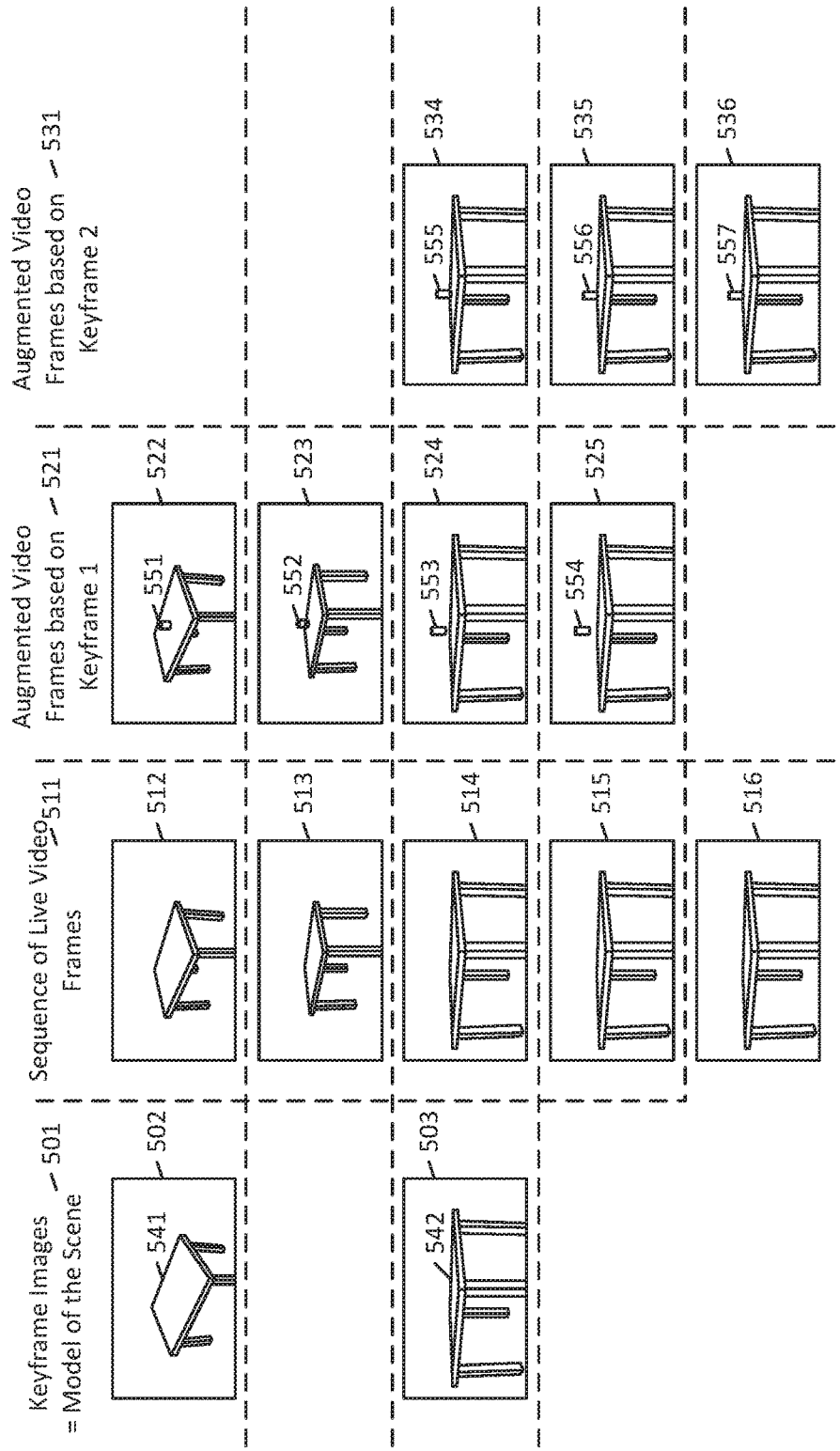
FIG. 5 shows an example flow diagram of a method for managing state change based on an updated keyframe according to one or more embodiments.

FIG. 5 illustrates another example use-case where the method is employed in an Augmented Reality System, where a virtual can (551) is rendered into camera images (512-516) of a real world environment. In the example of FIG. 5, the state change is postponed with respect to the selected keyframe in the pose determination algorithm. Thus, in one or more embodiments, an abrupt change in the appearance (such as position, scale, or orientation) of the virtual can in the image is postponed so that the user does not notice the change.

For purposes of this example, the virtual object is the can (551), the setup configuration is a particular keyframe (e.g. 502) that is used for determining the pose of the camera for a captured image, and the visualization configuration is the particular determined pose of the camera/object used for rendering the virtual object. The visualization frame is an augmented image 522), showing the camera image 512) of the real world environment overlaid by a rendering of the virtual object (551).

The real world environment may consist of a scene of a real table (e.g. (541)). A model of the scene may be available as keyframes, each consisting of an image (e.g. 502, 503)) of the table and a corresponding known 6 Degrees of Freedom camera pose, referred to as a keypose. In the example of FIG. 5, the keyframe images (502, 503) show the table (541, 542) from different points of view.

The scene may then be captured using a moving camera. For example; the camera of a mobile device. The second column (511) of FIG. 5 depicts the sequence of captured images, such as Live Video Frames (511). For each acquired image a pose determination method may determine the camera pose based on the captured image itself the scene model, and potentially a history of previously captured images and poses.

For the first acquired image (512) of the real world, the algorithm may find the best fitting keyframe 502, and determine the camera pose for image (512) based on image (512), keyframe image (502), and the known keypose of the keyframe image (502). The camera pose for image (512)

based on keyframe Image (502) may be used to render the virtual can (551) on top of the image (512), resulting in an augmented image (522).

For the second acquired image (513) of the real world, the algorithm may continue to consider the same keyframe image (502) to be the best fitting keyframe image. For example, the keyframe image may be determined as the best fitting keyframe image, or the algorithm for determining the best keyframe may not be triggered for every frame and uses the one considered best for the previous frame. Therefore, the algorithm may determine the pose for image (513) based on image (513), keyframe image (502), and the known keypose of the keyframe image (502). Alternatively, the algorithm may determine the pose for image (513) based on image (513), image 1512), and the previously determined pose for image (512), which was determined based on keyframe image (502) and the known keypose of the keyframe image (502). In both cases the determined pose originally may depend on the keyframe (502). The determined camera pose for image (513) based on keyframe (502) may be used to render the virtual can (552) on top of the image (513) resulting in an augmented image (523).

For the third acquired image (514) of the real world environment, the algorithm may now determine that another keyframe image is the best fitting one, namely keyframe (503). A standard approach may now directly use the new determined best fitting keyframe (503) to determine the pose for image (514) based on image (514), keyframe image (503), and the known keypose of the keyframe image (503). The determined camera pose for image (514) based on keyframe (503) may be used to render the virtual can (555) on top of the image (514), resulting in an augmented image (534). This change in the used keyframe (i.e., the setup configuration) could potentially result in a visible abrupt change in the pose (visualization configuration) and hence of the rendering of the virtual object, which would be noticed by the user. However, if the user was inattentive, the new keyframe (503) could be used to determine the pose and the final augmented image could be image (534). In the depicted example, however, the user is attentive, so keyframe (502) is still used to determine the pose for the visualization and the final augmented image is image (524). It should be noted that, due to imprecision of the tracking algorithm and the pose determined from keyframe (502) the can (553) may not b e rendered flush on top of the table but may float slightly above the table. That is, keyframe (503) may provide a more accurate pose, visible in image (534), where the can (555) is better aligned to the table. It may also be possible to determine a pose according to the new keyframe (503) to enable frame to frame tracking. However, this pose may not be used for the current rendering of the virtual object.

For the fourth acquired image (515) of the real world, the algorithm may again consider the keyframe image (503) to be the best fitting keyframe image. This may be the case because the algorithm for determining the best keyframe may not triggered for every frame and uses the one considered best from the previous frame. If the user is inattentive, the new keyframe (503) may be used to determine the pose (either directly or based on a previous pose tracked frame to frame originally based on keyframe 503) and the final augmented image would be image (535). In the depicted example however the user is again attentive, so keyframe (502) may be used to determine the pose and the final augmented image is image (525). Again, due to imprecision of the tracking algorithm and the pose determined from keyframe (502) the can (554) may not be rendered flush on top of the table, but floating above the table, or intersecting the table. In one or more embodiments, keyframe (503) could potentially deliver a more accurate pose, as in image (535), where the can (556) is better aligned to the table.

Figure 6:
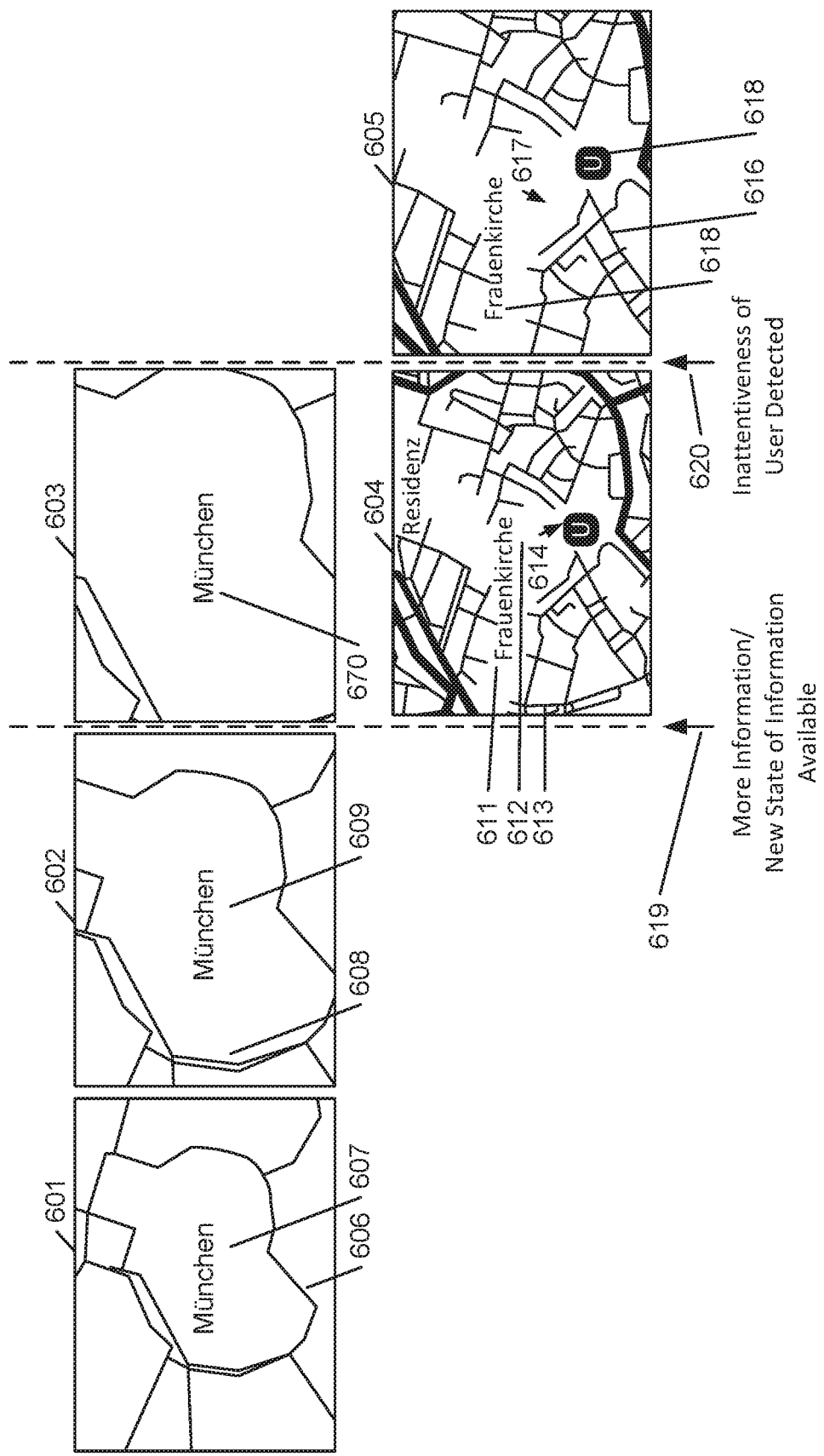
FIG. 6 shows an example flow diagram of a method for managing state change based on an updated level of detail according to one or more embodiments.

FIG. 6 illustrates another example use-case, where the user or the application itself is zooming into a map of a city. When zoomed out in the beginning (601), a big part of the city is shown and only coarse information is presented (major streets (606), city name (607)). When zooming in at 602, only the big streets (608) and the city name (609) continue to be displayed. However, when zooming in further the application may attempt to display an image, such as 604, with additional information (less major streets (613), labels for points of interest (611), underground transport (614)). The city name instead may not be displayed anymore (612). When additional information should be displayed 619 can depend on availability, for example when dynamically streamed content is complete or it depends on specification to keep the GUI free of cluttering by too many labels/layers.

Again the proposed method may keep the old setup configuration (only major streets and city name (610) visible) for the rendering resulting in image 603. The change to the "new" setup configuration (the visibility of e.g. the smaller streets) is postponed until the user is inattentive (620). After it has been detected that the user was inattentive, the "new"/second setup configuration is used for the rendering resulting in image 605 with the now visible smaller streets (616), labels for points of interest (615), underground transport (618) and the city name not displayed anymore (617). Because the user was inattentive while the setup configuration (visibility of layers) was changed, he/she is likely to have missed the change.

Figure 7:
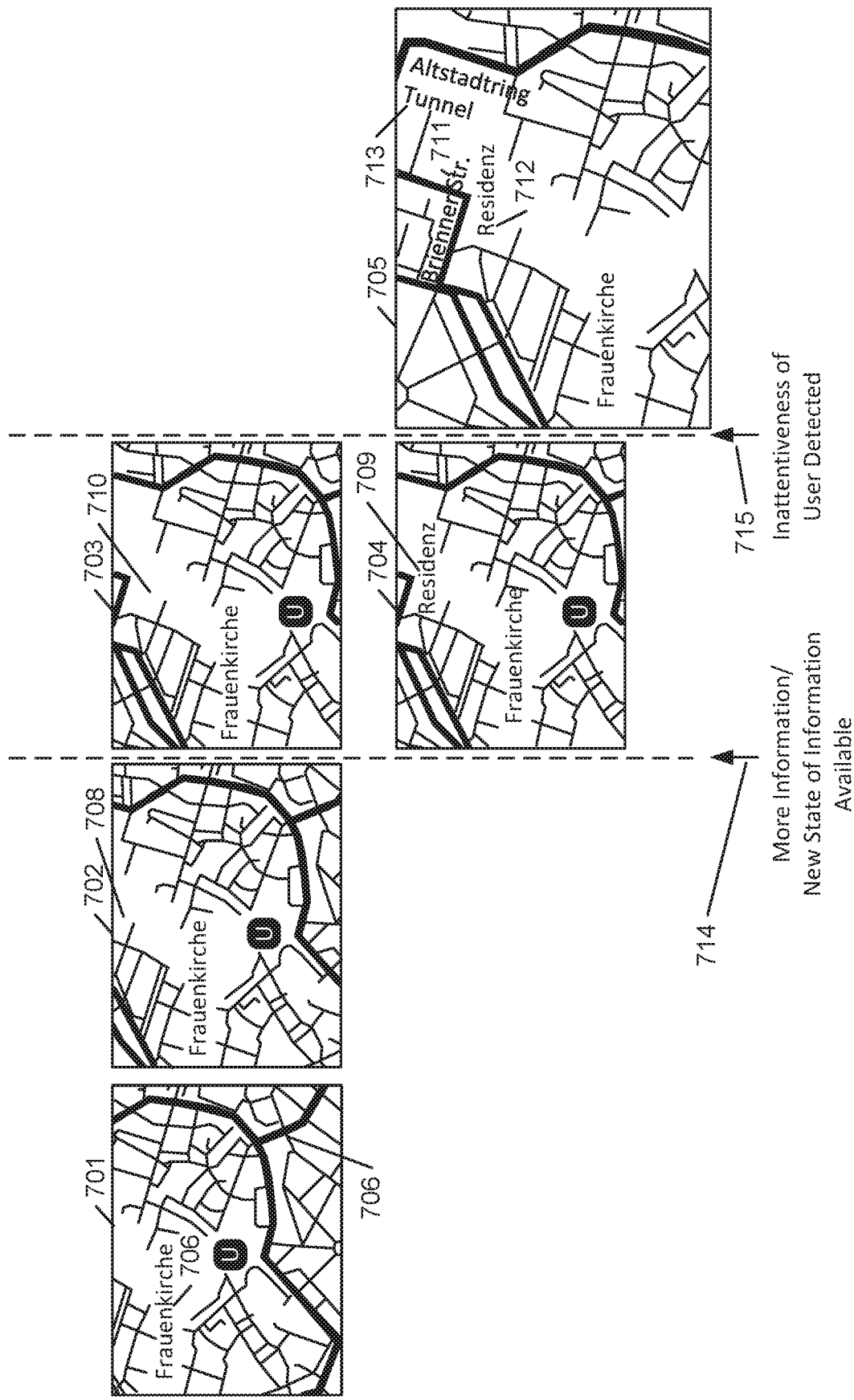
FIG. 7 shows an example flow diagram of a method for managing state change based on an updated level of detail according to one or more embodiments.

FIG. 7 illustrates another example use-case, where the user is panning on a map of a city, or the GPS position is updated and the application accordingly centers the map. In the initial displayed image (701) of the map, streets (707) as well as labels (706) of points of interest are displayed. By scrolling down the map, in the next displayed image (702) new parts of the map become visible. These new parts (708) initially do not have any labels (for example, "Residenz" is missing). The missing labels may be caused, for example, by dynamic streaming of content or by specification to avoid clamped labels. When a user scrolls down, at a certain point in time (714) (either due to a complete download or due to specification) the new labels for the new map areas may suddenly appear, a s depicted in image 704, where the label "Residenz" (709) appears. However, the old setup configuration for the rendering resulting in image 703 where the label "Residenz" is still not visible (710) remains. The change to the "new" setup configuration (with the new labels, e.g. Residenz visible) may be postponed until the user is inattentive. When the user is detected being inattentive (715), the "new" setup configuration can be used for the rendering resulting in image 705 with the now visible new labels (711, 712, 713). Because the user was inattentive while the setup configuration (visibility of labels) was changed, he/she is likely to have missed the change.

Figure 8:
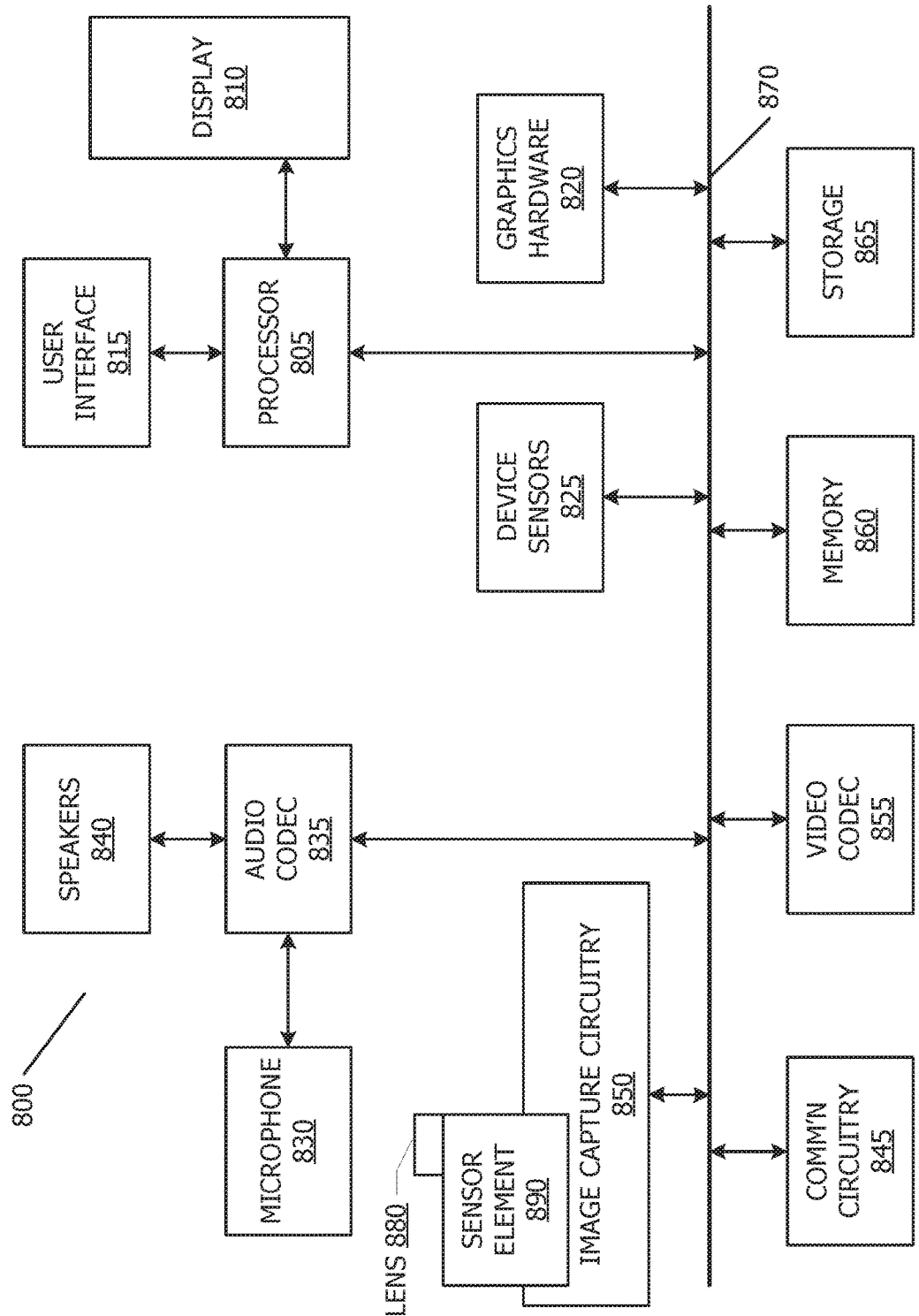
FIG. 8 shows an example system diagram of a computing device according to one or more embodiments.

Referring now to FIG. 8, a simplified functional block diagram of illustrative multifunction device 800 is shown according to one embodiment. Multifunction electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture circuitry 850 (e.g., including camera system 100) video codec(s) 855 (e.g., in support of digital image capture unit 850), memory 860, storage device 865, and communications bus 870. Multifunction electronic device 800 may be, for example, a digital camera or a personal electronic device such as a personal digital assistant (PDA), personal music player, mobile telephone, or a tablet computer.

Processor 805 may execute instructions necessary to carry out or control the operation of many functions performed by device 800 (e.g., such as the generation and/or processing of images and single and multi-camera calibration as disclosed herein). Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include one (or more) lens assemblies 880, where each lens assembly may have a separate focal length. Each lens assembly may have a separate associated sensor element 890. Alternatively, two or more lens assemblies may share a common sensor element. Image capture circuitry 850 may capture still and/or video images. Output from image capture circuitry 850 may be processed, at least in part, by video codec(s) 865 and/or processor 805 and/or graphics hardware 820, and/or a dedicated image processing unit or pipeline incorporated within circuitry 865. Images so captured may be stored in memory 860 and/or storage 855.

Sensor and camera circuitry 850 may capture still and video images that may be processed in accordance with this disclosure, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for triggering state change, comprising:
   displaying a first series of frames, wherein the first series of frames are rendered based on image data and a first setup configuration;
   during the displaying of the first series of frames, obtaining a second setup configuration for the image data;
   in response to obtaining the second setup configuration, monitoring an eye status of a user's eye to detect an anticipated inattentiveness status;
   in response to detecting the anticipated inattentiveness status, rendering, a second series of frames based on the image data and the second setup configuration; and
   in response to detecting an inattentiveness status, causing the second series of frames to be displayed on a display device.

2. The method of claim 1, wherein monitoring the eye status comprises:
   capturing sensor data corresponding to the user's eye; and
   determining, based on the sensor data, that a user is preparing to enter the inattentiveness status.

3. The method of claim 2, wherein detecting the inattentiveness status comprises monitoring a gaze direction of the eye to confirm the eye is not gazing on the display device.

4. The method of claim 2, wherein detecting the inattentiveness status comprises monitoring the sensor data to confirm an affirmative blink.

5. The method of claim 4, wherein monitoring the sensor data to confirm an affirmative blink further comprises:
   obtaining a plurality of image frames from a camera facing an eye corresponding to the eye status, and
   determining that a user monitoring the plurality of image frames for a blink of the eye.

6. The method of claim 1, wherein the first setup configuration and the second setup configuration are associated with virtual content displayed in a real environment.

7. The method of claim 1, wherein the first setup configuration is associated with a first keyframe to render a virtual object based on a first camera pose, and wherein the second setup configuration is obtained in response to determining that a second keyframe is an improved fit for an updated camera pose.

8. A non-transitory computer readable medium comprising computer readable code for triggering state change, executable by one or more processors to:
   display a first series of frames, wherein the first series of frames are rendered based on image data and a first setup configuration;
   during the display of the first series of frames, obtain a second setup configuration for the image data;
   in response to obtaining the second setup configuration, monitor an eye status of a user's eye to detect an anticipated inattentiveness status;
   in response to detecting the anticipated inattentiveness status, render, a second series of frames based on the image data and the second setup configuration; and
   in response to detecting an inattentiveness status, cause the second series of frames to be displayed on a display device.

9. The non-transitory computer readable medium of claim 8, wherein the computer readable code to monitor the eye status comprises computer readable code to:
   capture sensor data corresponding to the user's eye; and
   determine, based on the sensor data, that a user is preparing to enter the inattentiveness status.

10. The non-transitory computer readable medium of claim 9, wherein the computer readable code to detect the inattentiveness status comprises computer readable code to monitor a gaze direction of the eye to confirm the eye is not gazing on the display device.

11. The non-transitory computer readable medium of claim 9, wherein the computer readable code to detect the inattentiveness status comprises computer readable code to monitor the sensor data to confirm an affirmative blink.

12. The non-transitory computer readable medium of claim 11, wherein the computer readable code to monitor the sensor data to confirm an affirmative blink further comprises computer readable code to:
obtain a plurality of image frames from a camera facing an eye corresponding to the eye status, and
determine that a user monitoring the plurality of image frames for a blink of the eye.

13. The non-transitory computer readable medium of claim 8, wherein the first setup configuration and the second setup configuration are associated with virtual content displayed in a real environment.

14. The non-transitory computer readable medium of claim 8, wherein the first setup configuration is associated with a first keyframe to render a virtual object based on a first camera pose, and wherein the second setup configuration is obtained in response to determining that a second keyframe is an improved fit for an updated camera pose.

15. A system for triggering state change, comprising:
a display device;
one or more processors; and
one or more computer readable media comprising computer readable code executable by the one or more processors to:
display a first series of frames, wherein the first series of frames are rendered based on image data and a first setup configuration;
during the display of the first series of frames, obtain a second setup configuration for the image data;
in response to obtaining the second setup configuration, monitor an eye status of a user's eye to detect an anticipated inattentiveness status;
in response to detecting the anticipated inattentiveness status, render, a second series of frames based on the image data and the second setup configuration; and
in response to detecting an inattentiveness status, displaying the second series of frames on the display device.

16. The system of claim 15, wherein the computer readable code to monitor the eye status comprises computer readable code to:
capture sensor data corresponding to the user's eye; and
determine, based on the sensor data, that a user is preparing to enter the inattentiveness status.

17. The system of claim 16, wherein the computer readable code to detect the inattentiveness status comprises computer readable code to monitor a gaze direction of the eye to confirm the eye is not gazing on the display device.

18. The system of claim 16, wherein the computer readable code to detect the inattentiveness status comprises computer readable code to monitor the sensor data to confirm an affirmative blink.

19. The system of claim 18, wherein the computer readable code to monitor the sensor data to confirm an affirmative blink further comprises computer readable code to:
obtain a plurality of image frames from a camera facing an eye corresponding to the eye status, and
determine that a user monitoring the plurality of image frames for a blink of the eye.

20. The system of claim 15, wherein the first setup configuration and the second setup configuration are associated with virtual content displayed in a real environment.

* * * * *